May 27, 1941. C. E. PIERCE 2,243,259
METHOD OF ELECTRICALLY TESTING CONDUCTORS TO LOCATE POINT OF A FAULT
Filed May 20, 1940
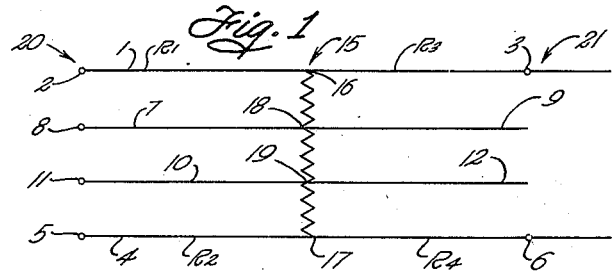
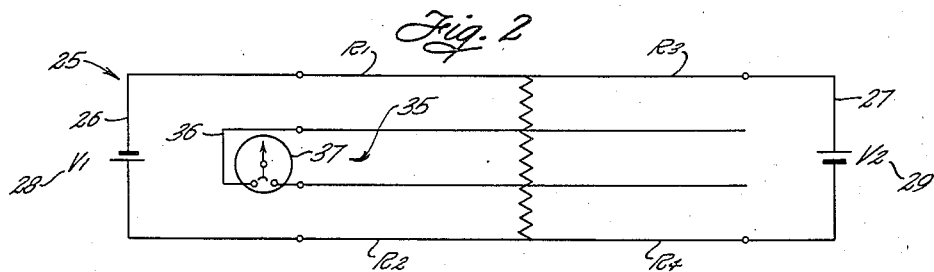
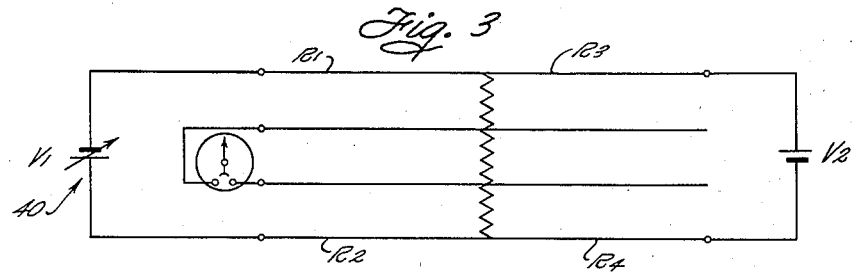
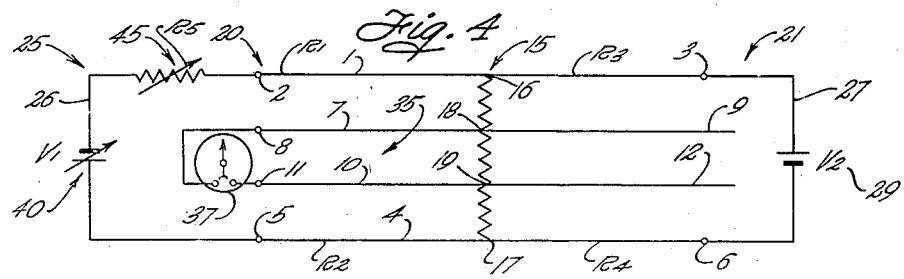
Inventor
CHARLES E. PIERCE
By Hazard and Miller
Attorneys Patented May 27, 1941

2,243,259

UNITED STATES PATENT OFFICE 2,243,259

METHOD OF ELECTRICALLY TESTING CONDUCTORS TO LOCATE POINT OF A FAULT

Charles E. Pierce, North Hollywood, Calif.

Application May 20, 1940, Serial No. 336,213

12 Claims. (Cl. 175—183)

One of the problems which develops particularly in the use of telephone and telegraph cables of the multi-core type arises from the short circuiting of two or more of the cores by moisture or the like which enters the cable, the cores being defined as the individual transmitting lines or wires forming the component conductors of the cable. There are many methods of procedure and apparatus used in the attempt to locate the fault in order that repair crews may be directed to the specific place where the fault occurs and may then open a cable and make repairs. It is well understood that in this type of communication at certain offices there are maintained full details of the resistance of the cores, the conductors, which may be designated in so many ohms per mile or unit of distance and by determining the resistance and other factors by comparatively simple equations the distance of the fault from the testing station may be determined; however a number of difficulties arise in these procedures. For instance in the known Murray and Varley loop methods it is necessary that there be at least one good conductor which is not short circuited at the location of the fault usually designated as the point X, that is, the unknown place in the cable. Another method is described in the patent to Graf, No. 1,865,687 for Method of locating the fault in the case of multi-conductor cables damaged by short circuiting, issued July 5, 1932. This patent requires that simultaneous measurements of current flows at two different locations must be made. In case of cable trouble this would be a very bad feature since one set of readings would often be taken under adverse conditions on a pole or in a manhole where accurate readings would be difficult to obtain. Also current flowing in wet insulation tends to change the conditions, thus increasing the difficulty of obtaining reliable readings. With any of these circumstances which rely upon or make use of the current flow across the fault or short circuit, there is always the factor that the resistance of the fault may change quite rapidly and therefore the current flowing across the fault may have considerable variation in a comparatively short time even during the time period when the test is being made.

A main object and feature of my present invention while especially developed for locating faults or short circuits in multiple strand or core telephone or telegraph cables or the like, is that it is not limited to such specific use but may be employed for determining the location of faults or short circuits in for instance power transmission lines and other electrical conductors connected between two stations whether or no their routes may be close together or considerably diverging provided there would be some location where there may be a short circuit between a group of transmission lines.

An object and feature of my invention is to determine the location of a fault or short circuit described specifically as applied to multiple core cables in which I make use of a function of a zero potential, that is, a circumstance that no current flow across the fault between the various cores of the cables or of the conducting lines and wires. Considered more specifically and as applied to a multiple core cable, I provide for making test connections between opposite ends of, for instance, two cores forming these into a loop and applying a potential, that is, voltage, at these connections at the opposite end of the loop, these potentials being in series and thus poled in the same direction. This will develop a current flow in the loop and consequently a voltage at the fault urging a current flow across the faults. Then by using a voltage indicating instrument such as a galvanometer or other sensitive meter at the testing station, I vary the voltage for instance at one of the testing ends or vary both voltage and resistance in one of the cores until a condition is developed of a zero reading of the galvanometer or other instrument which indicates a condition of a zero potential across the fault and thus no current flow. From this by developing an equation of the respective voltages and the known resistances in the various parts of the core between the two testing stations, the resistance of such fault from one of the stations may be determined; then by a knowledge and record of the resistance in the lines, the location of the fault may be determined in relation to the two end test places.

Considered in more specific application, in a cable having at least four cores with a fault or short circuit across such four cores or conducting lines, my invention comprehends forming a loop with at least two of the cores and using batteries in the connecting ends of the loop, these batteries applying a known potential or voltage, one or both of which may be variable. Where desired I may also transmit the current through a variable resistance connected with one of the cores. As above mentioned the batteries are poled in the same direction, that is, in series. Between the other two cores, that is, the third and the fourth of the at least four cores, I place a voltage detecting instrument such as a galvanometer or a meter at one of the testing stations, preferably the station having the variable voltage batteries and/or resistor. The voltage is then varied by at least one of the batteries until the condition occurs of a zero reading of the galvanometer, or meter. This hence produces a condition of a zero potential across the fault as to the four cores, this representing a condition of no current flow across such fault. Thence by the use of an equation, the same or equivalent to that disclosed herein, the location of the fault may be determined in relation to the testing stations, one of which is usually at an established place and the other in the field by a workman merely connecting a battery of known voltage across two of the four cores at the remote end of the loop.

My invention is illustrated in connection with the accompanying drawing and diagrams, in which:

Fig. 1 is a diagram indicating four wires or cores of a multicore-cable or the equivalent showing the short circuiting and to indicate the resistances used in the equations.

Fig. 2 is a diagram illustrating the cores of Fig. 1 with two of the cores formed into a loop by end connections provided with batteries and having a pair of other cores with a galvanometer inserted at one end.

Fig. 3 is a diagram similar to Fig. 2 indicating a variable battery at the main testing end of the circuit.

Fig. 4 is a diagram similar to Figs. 2 and 3 illustrating a variable battery and variable resistance at one of the connecting ends at the main testing station.

Referring first to Fig. 1, this is intended to illustrate four cores or electrical conductors of a multi-core electric cable or any other electrical conductors leading between two stations in which there is a short circuit across some or all of the cores or circuit lines at some undetermined place. In this illustration core 1 has terminal ends 2 and 3, core 4 terminal ends 5 and 6, core 7 terminal ends 8 and 9 and the fourth core 10, terminal ends 11 and 12. The place of the short circuit is indicated at 15, this making a connection with the core 1 at 16, core 4 at 17, core 7 at 18 and core 10 at 19. In this diagram the main or station testing end is indicated at 20 and the remote or field testing end at 21.

Of these cores it is only necessary to consider the resistance of a pair. The resistance of core 1 between the terminal end 2 and the short circuit 16 is indicated as $R_1$. The resistance of core 4 from the terminal 5 to the short circuit 17 is designated $R_2$. Core 1 has a resistance from the short circuit 16 to the terminal 3 designated $R_3$ and the core 4 from the short circuit 17 to the terminal 6 has the resistance $R_4$. The total resistance of core 1, $R_1$ and $R_3$, is known and also the total resistance of core 4, $R_2$ and $R_4$ is known. If the problem can be solved as to sum of the resistances $R_1$ and $R_2$, then by knowing the resistance of each core per unit of length or distance, the location of the short circuit 15 may be determined relative to the terminal stations 20 and 21, thence a repair crew may be sent from either of the terminals to make the necessary repairs.

By my procedure and referring to Fig. 2, I form a loop circuit 25 by providing a connection 26 between the cores 1 and 4 and between their terminals 2 and 5 respectively. At the opposite ends I also make the connection 27 likewise between the cores 1 and 4 from their respective terminals 3 and 6. In the connection 26 I insert a battery 28, the voltage being indicated as $V_1$ and in the connection 27 I insert another battery 29 having the voltage designation $V_2$. I form a second loop 35 by making a connection at the testing station 20 between the cores 7 and 10 connecting their respective terminals 8 and 11 by the connecting lead 36 and in this install a galvanometer 37. The other portions of this loop include the part of core 7 between the terminal 8 and the short circuit connection 18, the portion of the short circuit between 18 and 19 and the part of the core 10 between this short circuit portion 19 and the terminal 11. Due to the complete short circuiting across the four cores or cables, there is also formed an electrical connection between the galvanometer 37 and the cores 1 and 4 at the short circuit 15, the points of connection being respectively at 16 and 17.

Referring to the diagram of Fig. 3, this is essentially the same as illustrated in connection with Fig. 2 except that the battery 40 is illustrated as variable and having the voltage $V_1$. In Fig. 4 the battery 40 is also variable and has the voltage indication $V_1$. In the part of the loop connection 26 I also insert a variable resistor 45 and indicated as having the resistance or ohm value $R_5$.

In these connections the batteries are poled in series, that is, the sources of the voltages $V_1$ and $V_2$ are connected to the loop 25 formed of two of the cores with their potentials operating in the same direction. When a condition is obtained in which there is no difference of potential in the short circuit 15 between the points 16 and 17, an equation may be drawn up and solved by which the location of this short circuit may be determined between either of the test stations 20 or 21.

In the conditions in which no leakage current flows across the short circuit 15 from the points 16 and 17, the following equations hold true:

(a) $$\frac{V_1}{V_2}=\frac{R_1+R_2}{R_3+R_4}$$

(b) $$\frac{V_1}{V_1+V_2}=\frac{R_1+R_2}{R_1+R_2+R_3+R_4}$$

The galvanometer 37 indicates potential differences in the loop 35 between the points 18 and 19 of the portions of the cores 7 and 10 and if I change either or both voltages $V_1$ or $V_2$ a condition can be obtained in which the galvanometer reading zero shows that there is no difference of potential between these points; there are sufficient known factors by which the equation may be solved to determine the value of $R_1+R_2$.

As it is usually more satisfactory to insert a resistor 45 designated $R_5$ in the connecting end 26 of the loop 25, the following equations hold when there is no potential across the short circuit 15 indicated by the galvanometer reading being brought to zero. In this case the equations (c) $$\frac{V_1}{V_2}=\frac{R_5+R_1+R_2}{R_3+R_4}$$

(d) $$\frac{V_1}{V_1+V_2}=\frac{R_5+R_1+R_2}{R_5+(R_1+R_2+R_3+R_4)}$$

obtain when there is no potential across the short circuit 15 at the points 16, 18, 19 or 17. A solution of these equations is represented by the following:

(e)
$$R_5 + R_1 + R_2 = \frac{V_1}{V_1 + V_2} \times (R_5 + (R_1 + R_2 + R_3 + R_4))$$

and solving for $R_1$ plus $R_2$, (f)
$$R_1 + R_2 = \frac{V_1}{V_1 + V_2} \times (R_5 + (R_1 + R_2 + R_3 + R_4)) - R_5$$

In this equation $V_1$ and $V_2$ are known; $R_5$ can be measured and the sum $R_1 + R_2 + R_3 + R_4$ is the resistance of the loop circuit 25 and would ordinarily be known from the records. Consequently the equation can be solved to give the value of $R_1 + R_2$ in ohms. Since the resistance per unit length of the conductors would be available from the records the value of $R_1 + R_2$ could then be used to determine the distance from testing station 20 to the short circuit 15. Hence a repair crew may be sent to the location of the break in the cable.

From the above description it will be noted that my method and the apparatus employed are quite simple and the variable instruments may be located at a fixed test station, then the battery 29 used in the field work may be of a fixed voltage and it is only necessary for a field workman to properly couple this in the loop 25 formed with two of the cores or conductors. It will thus be seen that where all of the cores or conductors of a multiple core cable have a short circuit my procedure materially simplifies the manner of operation. It is obvious that the same type of tests may be applied to other conductors such as open wires either used in telephone or telegraph circuits or in power lines provided of course that four wires or lines were short circuited and the resistances of the several lines a matter of record.

Various changes may be made in the details of the construction without departing from the spirit or scope of the invention as defined by the appended claims.

I claim:

1. The method of ascertaining the location of a fault in a multi-conductor electric circuit having a short circuit fault across at least four of the conductors, consisting in connecting two of the conductors at both ends into a loop, at these end connections employing voltages poled in the same direction and obtaining a condition of no potential difference between the conductors through the fault.

2. A method of ascertaining the location of a fault in a multi-conductor electric circuit having a short circuit fault across all the conductors consisting in connecting two of the conductors at both ends into a loop, supplying a voltage at both connections poled in the same direction, obtaining a current reading at one end of a third and fourth conductor and adjusting the voltages to develop a zero reading of the current and thus a condition of zero potential at the fault.

3. The method of ascertaining the location of a fault in a multi-core cable having inter-core faults across at least four cores consisting in connecting two of the faulted cores at both ends into a loop applying a variable voltage at one of the connections and a constant voltage at the other connection, both poled in the same direction, adjusting the first voltage until a condition of zero potential is obtained across the fault.

4. The method of ascertaining the location of a fault in a multi-core cable having inter-core faults across at least four cores consisting in connecting two of the faulted cores at both ends into a loop applying a variable voltage at one of the connections and a constant voltage at the other connection, both poled in the same direction, adjusting the first voltage until a condition of zero potential is obtained across the fault, passing the current through the loop through a variable resistance connected to one of the faulted cores of the loop.

5. The method of ascertaining the location of a fault in a multi-core cable having inter-core faults across at least four cores consisting in connecting two of the faulted cores at both ends into a loop, providing a variable voltage at the testing end of the loops and a fixed voltage at the other connecting end of the loop, both voltages being poled in the same direction, obtaining a galvanometer reading between the ends of a third and a fourth faulted core of the cable at the testing end and adjusting the voltages until a zero reading is obtained, thereby giving a condition of zero potential and hence no current flow across the fault between any of the faulted cores.

6. The method of ascertaining the location of a fault in a multi-core cable having inter-core faults across at least four cores consisting in connecting two of the faulted cores at both ends into a loop, providing a variable voltage at the testing end of the loops and a fixed voltage at the other connecting end of the loop, both voltages being poled in the same direction, obtaining a galvanometer reading between the ends of a third and a fourth faulted core of the cable at the testing end until a zero reading is obtained, thereby giving a condition of zero potential and hence no current flow across the fault between any of the cores, passing the current through the loop through a variable resistance connected to one of the faulted cores of the loop.

7. An apparatus for determining the location of a fault involving at least four conductors in a multi-core cable comprising in combination conducting connections at opposite ends of a pair of faulted cores to form a loop and each of the connections having a battery, the two batteries being poled in the same direction, one of the batteries having a variable voltage, a connection at one end of a second pair of the faulted cores having an electric current testing instrument therein having means to read a zero current flow.

8. An apparatus for ascertaining the location of a short circuit fault involving at least four conductors in multi-conductor circuits comprising conducting connections at opposite ends of a pair of conductors forming a loop with such conductors, a battery in each connection, the two batteries being poled in the same direction, one of the batteries at a test station being variable, a variable resistor in the connection at the station having the variable battery, a connection between another pair of the faulted conductors at the test station and having a galvanometer in such latter connection to obtain a no potential reading by varying the voltage of the battery and the resistance through the resistor.

9. A method of ascertaining the location of a fault in a multi-conductor electric circuit having a short circuit across at least four conductors consisting in connecting two of the conductors at both ends into a loop, supplying a voltage at both connections poled in the same direction, obtaining a voltage indication reading between the third and fourth conductor and adjusting the voltages until a condition of zero potential at the fault is indicated.

10. An apparatus for determining the location of a fault involving at least four conductors comprising in combination conducting connections at opposite ends of a pair of the conductors to form a loop and each of the connections having a battery, the two batteries being poled in the same direction, one of the batteries having a variable voltage, a connection at one end of a second pair of the faulted conductors having a voltage indicating instrument thereon on which instrument a condition of no voltage gives an indication of no current flow across the fault and therefore indicates no voltage across the fault.

11. An apparatus for ascertaining the location of a short circuit fault involving at least four conductors in a multi-conductor circuit comprising a conducting connection at opposite ends of a pair of faulted conductors forming a loop with such pair of conductors, a battery in each connection, the two batteries being poled in the same direction, a variable resistor at one of the connections, a connection between another pair of the faulted conductors having an electric current testing instrument with means to determine a condition of no potential, that is, no current flow across the fault.

12. The method of ascertaining the location of a fault in multi-conductors having a fault across at least four conductors consisting in connecting two of the faulted conductors at both ends into a loop, applying a known voltage at both connections, both poled in the same direction, connecting two of the other faulted conductors at one end, developing an electric current in the first conductors through a variable resistance and obtaining a reading of the potential in the second pair of conductors until a condition of no potential and hence no current flow is obtained across the fault between any of the four faulted conductors.

CHARLES E. PIERCE.